(12) United States Patent
Hurwitz

(10) Patent No.: US 12,009,916 B2
(45) Date of Patent: Jun. 11, 2024

(54) RADIO FREQUENCY CONDITION AWARE AUDIO BUFFERING

(71) Applicant: Google LLC, Mountain View, CA (US)

(72) Inventor: Jonathan D. Hurwitz, Cupertino, CA (US)

(73) Assignee: Google LLC, Mountain View, CA (US)

( * ) Notice: Subject to any disclaimer, the term of this patent is extended or adjusted under 35 U.S.C. 154(b) by 404 days.

(21) Appl. No.: 17/295,657

(22) PCT Filed: Jul. 23, 2019

(86) PCT No.: PCT/US2019/043110
§ 371 (c)(1),
(2) Date: May 20, 2021

(87) PCT Pub. No.: WO2021/015749
PCT Pub. Date: Jan. 28, 2021

(65) Prior Publication Data
US 2022/0014302 A1 Jan. 13, 2022

(51) Int. Cl.
*H04W 4/80* (2018.01)
*H04L 1/00* (2006.01)
(Continued)

(52) U.S. Cl.
CPC .......... *H04L 1/0002* (2013.01); *H04L 1/1874* (2013.01); *H04L 65/762* (2022.05); *H04W 4/80* (2018.02); *G06F 3/165* (2013.01)

(58) Field of Classification Search
CPC .......... H04W 4/80; H04W 4/021; H04W 4/60
(Continued)

(56) References Cited

U.S. PATENT DOCUMENTS

| 6,055,268 A | 4/2000 | Timm et al. |
| 7,636,132 B2 | 12/2009 | Sakamoto |

(Continued)

FOREIGN PATENT DOCUMENTS

| CN | 102047592 A | 5/2011 |
| CN | 106028066 A | 10/2016 |

(Continued)

OTHER PUBLICATIONS

International Preliminary Report on Patentability from International Application No. PCT/US2019/043110, dated Feb. 3, 2022, 8 pp.
(Continued)

*Primary Examiner* — Joseph Arevalo
(74) *Attorney, Agent, or Firm* — Shumaker & Sieffert, P.A.

(57) ABSTRACT

An example method includes receiving, by a communication controller of a source device and from an audio source of the source device, audio data to be wirelessly transmitted to a sink device, wherein the audio data is received from the audio source at a rate; storing, by the communication controller and in a buffer, the audio data as a sequence of audio blocks, wherein each audio block includes audio data for a respective output time; transmitting, by the source device and to the sink device, audio blocks of the sequence of audio blocks using a wireless link between the source device and the sink device; determining a current condition of the wireless link; and automatically adjusting, by the communication controller and based on the current condition of the wireless link, the rate at which audio data is received from the audio source.

15 Claims, 4 Drawing Sheets

(51) Int. Cl.
  *H04L 1/1867* (2023.01)
  *H04L 65/75* (2022.01)
  *G06F 3/16* (2006.01)

(58) Field of Classification Search
  USPC ....... 370/310, 350, 474, 311, 229, 417, 253, 370/389, 468, 352, 401
  See application file for complete search history.

(56) References Cited

U.S. PATENT DOCUMENTS

| | | | |
|---|---|---|---|
| 11,678,128 B2* | 6/2023 | Edwards | H04R 25/552 381/23.1 |
| 2006/0193273 A1* | 8/2006 | Passier | G08C 17/02 370/310 |
| 2017/0111421 A1 | 4/2017 | Schmidt et al. | |
| 2019/0014050 A1* | 1/2019 | Wang | H04L 49/9005 |
| 2019/0104424 A1* | 4/2019 | Hariharan | H04L 1/1621 |

FOREIGN PATENT DOCUMENTS

| | | |
|---|---|---|
| WO | 2007035147 A1 | 3/2007 |
| WO | 2011153475 A1 | 12/2011 |

OTHER PUBLICATIONS

Response to Communication Pursuant to Rules 161(1) and 162 EPC dated Mar. 7, 2022, from counterpart European Application No. 19749969.2, filed Aug. 31, 2022, 17 pp.

International Search Report and Written Opinion of International Application No. PCT/US2019/043110, dated Apr. 22, 2020, 14 pp.

Audio, Telephony, and Automotive Working Group, "Advanced Audio Distribution: Bluetooth profile specification", v1.3.2, Revise date; Jan. 21, 2019, 73 pp.

First Office Action and Search Report, and translation thereof, from counterpart Chinese Application No. 201980084274.4 dated Nov. 14, 2023, 25 pp.

Notice of Intent to Grant and Text Intended to Grant from counterpart European Application No. 19749969.2 dated Jan. 2, 2024, 7 pp.

First Examination Report from counterpart Indian Application No. 202147023655 dated Dec. 13, 2023, 7 pp.

Response to Office Action dated Dec. 13, 2023, from counterpart Indian Application No. 202147023655 filed Apr. 9, 2024, 18 pp.

* cited by examiner

RADIO FREQUENCY CONDITION AWARE AUDIO BUFFERING

This application is a 371 application of International Patent Application No. PCT/US2019/043110, filed 23 Jul. 2019, the entire contents of which is incorporated herein by reference.

BACKGROUND

Some computing devices may be capable of wirelessly streaming audio data to other devices. For instance, a mobile computing device may be capable of wirelessly streaming audio data to a pair of wireless headphones using BLUETOOTH or another wireless link such as Wi-Fi. As the successful transmission of data over a wireless link is not guaranteed and may suffer from latency, some devices (both transmitting and receiving) may include buffers to store data to be transmitted, or data that has been received. The receiving device may utilize audio data stored in its buffer to playback audio at a particular time, even if additional audio data is not being received at the particular time. So long as additional audio data is received prior to the buffer at the receiving device becoming depleted, the received device may be able to continuously playback audio data.

SUMMARY

In general, techniques of this disclosure are directed to techniques for preventing gaps from occurring in audio data streaming over a wireless link. At an example source device, an audio source of the source device (e.g., a digital signal processor) may provide audio data to a communications controller of the source device, which stores blocks of audio data in a buffer. The communications controller typically sends, in a first in first out scheme, blocks from the buffer to a sink device, and removes a block from the buffer when a corresponding acknowledgement (ACK) message is received back from the sink device. If a corresponding ACK message is not received for a particular block that was transmitted, the communications controller may re-transmit the particular block. If too many blocks accumulate in the buffer (e.g., as would happen if the audio source keeps providing audio data to the communications controller but ACK messages are not received fast enough due to a bad radio frequency (RF) link), the communications controller may drop the oldest blocks from the buffer without ever transmitting the dropped blocks. This dropping of blocks may result in audio gaps.

In accordance with one or more techniques of this disclosure, the communications controller of the source device may automatically adjust a rate at which audio data is received from the audio source of the source device based on conditions of the wireless link between the source device and the sink device. For instance, the communications controller may determine a current condition of the wireless link (e.g., based on a lack of receipt of ACK messages). Based on the determined condition of the wireless link, the communications controller of the source device may apply "back pressure" to the audio source of the source device in order to reduce the rate at which blocks of audio data are inserted into the buffer of the source device. By reducing the rate at which blocks are inserted into the buffer, the communications controller of the source device may avoid having to drop the oldest blocks from the buffer. In this way, the techniques of this disclosure enable the communications controller of the source device to avoid creating audio gaps.

In one example, a method includes receiving, by a communication controller of a source device and from an audio source of the source device, audio data to be wirelessly transmitted to a sink device, wherein the audio data is received from the audio source at a rate; storing, by the communication controller and in a buffer, the audio data as a sequence of audio blocks, wherein each audio block includes audio data for a respective output time; transmitting, by the source device and to the sink device, audio blocks of the sequence of audio blocks using a wireless link between the source device and the sink device; determining a current condition of the wireless link; and automatically adjusting, by the communication controller and based on the current condition of the wireless link, the rate at which audio data is received from the audio source.

In another example, a source device includes a communication unit; an audio source; a communication controller; and at least one non-transitory computer-readable storage medium storing instructions that are executable by the communication controller to: receive, from the audio source and at a rate, audio data to be wirelessly transmitted to a sink device; store, in a buffer, the audio data as a sequence of audio blocks, wherein each audio block includes audio data for a respective output time; cause the communication unit to transmit, to the sink device and via a wireless link between the source device and the sink device, audio blocks of the sequence of audio blocks; determine a current condition of the wireless link; and automatically adjust, based on the current condition of the wireless link, the rate at which audio data is received from the audio source.

In another example, a non-transitory computer-readable storage medium storing instructions that, when executed, cause one or more processors of a source device to: receive, from an audio source of the source device and at a rate, audio data to be wirelessly transmitted to a sink device; store, in a buffer, the audio data as a sequence of audio blocks, wherein each audio block includes audio data for a respective output time; cause a communication unit of the source device to transmit, to the sink device and via a wireless link between the source device and the sink device, audio blocks of the sequence of audio blocks; determine a current condition of the wireless link; and automatically adjust, based on the current condition of the wireless link, the rate at which audio data is received from the audio source.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
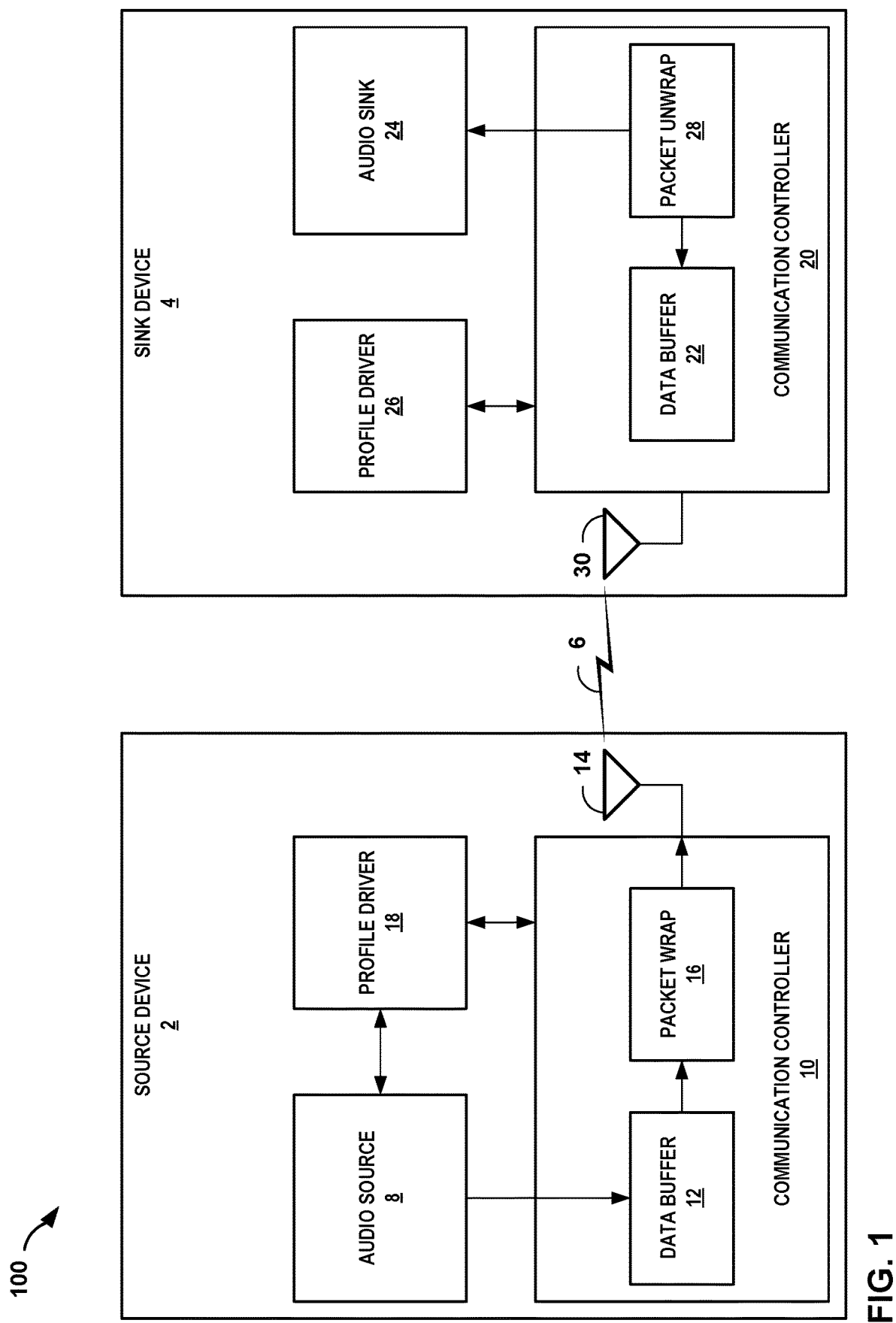
FIG. 1 is a conceptual diagram illustrating an example wireless audio streaming system including a source device and a sink device, in accordance with one or more aspects of the present disclosure.

FIG. 1 is a conceptual diagram illustrating an example wireless audio streaming system 100 including source device 2 and sink device 4, in accordance with one or more aspects of the present disclosure. System 100, in other examples, may also include other external devices, such as a server device, a network, or other camera devices.

In the example of FIG. 1, source device 2 can be a mobile phone. However, source device 2 may also be any other type of computing device such as a camera device, a tablet computer, a personal digital assistant (PDA), a laptop computer, a gaming system, a media player, an e-book reader, a television platform, an automobile navigation system, or a wearable computing device (e.g., a computerized watch, computerized eyewear, a computerized glove). As shown in FIG. 1, source device 2 includes audio source 8, communication controller 10, data buffer 12, packet wrap module 16, communication unit(s) 14, and profile driver 18.

Audio source 8 may provide audio data to one or more other components of source device 2. As discussed in further detail below, audio source 8 may output audio data to communication controller 10 for wireless transmission to a sink device, such as sink device 4. Audio source 8 may include one or both of a hardware path and/or a software path. One example of a hardware path is a digital signal processor (DSP) or application DSP (aDSP) that outputs audio data (e.g., samples. One example of a software path is a media server, or other service (e.g., a software encoding path such as AudioFlinger), that executes on a processor to output audio data. Regardless of the path, audio source 8 may output the audio data in response to commands received from another component of source device 2, such as an application executing at the source device.

Audio source 8 may output the audio data as a sequence of audio blocks. The sequence of audio blocks may be a time-based sequence in that successive blocks of the sequence correspond to successive audio playback periods. For instance, audio source 8 may output an nth audio block of a sequence of audio blocks that contains audio data to be played back during an nth period of time and an (n+1)th audio block of the sequence of audio blocks that contains audio data to be played back during an (n+1)th period of time that is later than the nth period of time.

One or more communication units 14 of source device 2 may communicate with external devices via one or more wired and/or wireless networks by transmitting and/or receiving network signals on the one or more networks. Examples of communication unit 14 include a network interface card (e.g. such as an Ethernet card), an optical transceiver, a radio frequency transceiver, a GPS receiver, or any other type of device that can send and/or receive information. Other examples of communication units 14 may include short wave radios, cellular data radios, wireless network radios (e.g., Wi-Fi radios, BLUETOOTH radios, etc.), as well as universal serial bus (USB) controllers.

Communication controller 10 may perform various operations to manage communications between source device 2 and an external device, such as sink device 4. As one example, communication controller 10 may receive data from one or more components of source device 2, and cause one or more of communication units 14 to wirelessly transmit a representation of the data to an external device. As another example, communication controller 10 may receive data from one or more of communication units 14 that has been wirelessly received from an external device.

In some examples, such as where wireless link 6 is a BLUETOOTH link, source device 2 may include profile driver 18 which may manage one or more aspects of streaming audio data from source device 2. In one specific example, profile driver 18 may include an advanced audio distribution profile (A2DP) driver. Profile driver 18 may manage aspects of the audio streaming such as codec negotiation, bitrate, retransmit, and any quality of service parameters. Other examples of profile driver 18 include, but are not limited to, hands-free profile (HFP) and any low-energy (LE) audio profiles.

Source device 2 may include audio source 8 and communication controller 10. Audio source 8 and communication controller 10 may perform operations described using software, hardware, firmware, or a mixture of hardware, software, and firmware residing in and/or executing at source device 2. Source device 2 may execute audio source 8 and communication controller 10 with one or more processors. Source device 2 may execute audio source 8 and communication controller 10 as a virtual machine executing on underlying hardware. Audio source 8 and communication controller 10 may execute as a service or component of an operating system or computing platform. Modules 8 and 10 may execute as one or more executable programs at an application layer of a computing platform. Audio source 8 and communication controller 10 may be otherwise arranged remotely to and remotely accessible to source device 2, for instance, as one or more network services operating at a network in a network cloud.

Communication controller 10 and audio source 8 may operate at different architectural layers of source device 2 (e.g., different layers of a stack). For instance, communication controller 10 may operate at a first architectural layer and audio source 8 may operate at a second architectural layer that is adjacent to or above the first architectural layer. In other words, communication controller 10 may operate at an ith architectural layer and audio source 8 may operate at least an (i−1)th architectural layer of source device 2.

In the example of FIG. 1, sink device 4 can be a pair of wireless headphones. However, sink device 4 may also be any other type of computing device such as a mobile phone, a vehicle, a wireless speaker, a camera device, a tablet computer, a personal digital assistant (PDA), a laptop computer, a gaming system, a media player, an e-book reader, a television platform, or a wearable computing device (e.g., a computerized watch, computerized eyewear, a computerized glove). As shown in FIG. 1, sink device 4 includes audio sink 24, communication controller 20, data buffer 22, packet unwrap module 28, communication unit(s) 30, and profile driver 26.

Communication controller 20 and communication unit(s) 30 may perform operations complementary to communication controller 10 and communication unit(s) 14 of source device 2. As one example, communication controller 20 may receive data from one or more components of sink device 4, and cause one or more of communication units 30 to wirelessly transmit a representation of the data to an external device, such as source device 2. As another example, communication controller 20 may receive data from one or more of communication units 30 that has been wirelessly received from an external device, such as source device 2.

In some examples, such as where wireless link 6 is a BLUETOOTH link, sink device 4 may include profile driver 26 which may perform complementary functions to profile driver 18 of source device 2. In one specific example, profile driver 26 may include an advanced audio distribution profile (A2DP) driver. Profile driver 26 may manage aspects of the audio streaming such as codec negotiation, bitrate, retransmit, and any quality of service parameters. Other examples of profile driver 26 include, but are not limited to, hands-free profile (HFP) and any low-energy (LE) audio profiles.

Audio sink 24 may perform operations complementary to audio source 8. For instance, audio sink 24 may render received audio data into one or more audio signals, which may be amplified and played back by one or more speakers.

Sink device 4 may include communication controller 20 and audio sink 24. Communication controller 20 and audio sink 24 may perform operations described using software, hardware, firmware, or a mixture of hardware, software, and firmware residing in and/or executing at sink device 4. Sink device 4 may execute communication controller 20 and audio sink 24 with one or more processors. Sink device 4 may execute communication controller 20 and audio sink 24 as a virtual machine executing on underlying hardware. Communication controller 20 and audio sink 24 may execute as a service or component of an operating system or computing platform. Communication controller 20 and audio sink 24 may execute as one or more executable programs at an application layer of a computing platform. Communication controller 20 and audio sink 24 may be otherwise arranged remotely to and remotely accessible to sink device 4, for instance, as one or more network services operating at a network in a network cloud.

In operation, communication controller 10 of source device 2 and communication controller 20 of sink device 4 may negotiate and establish wireless link 6. For instance, communication controller 10 and communication controller 20 may respectively cause communication units 14 and communication units 30 to exchange data to establish wireless link 6. Examples of wireless link 6 include, but are not limited to, BLUETOOTH links (including BLUETOOTH LE), Wi-Fi links, and the like.

Communication controller 10 may receive data from one or more components of source device 2. For instance, communication controller 10 may receive audio data from audio source 8. As discussed above, the audio data may be in the form of sequence of audio blocks. Communication controller 10 may implement packet wrap module 16, which may wrap/package/encapsulate or otherwise insert the audio blocks into packets. The packets may each contain one or more of the audio blocks. Communication controller 10 may cause communication units 14 to wirelessly transmit the packets to an external device. For instance, communication controller 10 may cause communication units 14 to wirelessly transmit the packets to sink device 4 via wireless link 6.

Communication units 30 and communication controller 20 of sink device 4 may receive the packets from source device 2. When a packet is successfully received, communication controller 20 may cause communication units 30 to output an acknowledgement of safe receipt to source device 2 (e.g., via wireless link 6). For instance, communication controller 20 may cause communication units 30 to output an acknowledgement message, also known as an ACK message.

Communication controller 20 may implement packet unwrap module 28 to unwrap/unpackage or otherwise remove the audio blocks from the packets. Communication controller 20 may provide the removed audio blocks to audio sink 24, which may playback, or cause the playback of the audio data included in the audio blocks at speakers included in or connected to sink device 4. In this way, source device 2 may stream audio data to sink device 4.

In some examples, a rate at which communication controller 10 receives the audio data from audio source 8 may not always match a rate at which communication controller 10 causes communication units 14 to wirelessly transmit the packets to sink device 4. As such, communication controller 10 may implement one or more buffers, such as data buffer 12, to store the audio blocks and/or generated packets prior to the packets being transmitted.

Data buffer 12 may have a size capable of storing audio blocks or corresponding packets for a particular period of time. For instance, data buffer 12 may be capable of storing 100 milliseconds (ms), 250 ms, 300 ms, 500 ms, or any other amount of audio blocks or corresponding packets.

Communication controller 10 may operate data buffer 12 under a first-in first-out (FIFO) principle. For instance, communication controller 10 may determine that the next block/packet to be transmitted is the oldest block/packet in data buffer 12 (i.e., the block/packet that was stored in data buffer 12 the least recently).

As discussed above, communication controller 10 may receive an acknowledgement message from sink device 4 when a packet is successfully received. In response to determining that a particular audio packet has been successfully received by sink device 4, communication controller 10 may remove an audio block corresponding to the particular audio data packet from data buffer 12. As one example, where data buffer 12 stores unwrapped (i.e., non-packetized) audio blocks, communication controller 10 may remove audio block n from data buffer 12 in response to determining that a packet encapsulating audio block n was successfully received by sink device 4 (e.g., in response to receiving an ACK message for the packet). As another example, where data buffer 12 stores wrapped (i.e., packetized) audio blocks, communication controller 10 may remove a packet encapsulating audio block n from data buffer 12 in response to determining that the packet encapsulating audio block n was successfully received by sink device 4 (e.g., in response to receiving an ACK message for the packet). The removal of blocks/packets from data buffer 12 may be referred to as draining packets from data buffer 12.

Where communication controller 10 determines that a packet was dropped (i.e., not successfully received by sink device 4), communication controller 10 may attempt to re-transmit the packet to sink device 4. For instance, in response to not receiving an ACK message for a particular packet within a period of time after transmitting the particular packet, communication controller 10 may attempt to re-transmit the packet to sink device 4. Additionally or alternatively, communication controller 10 may determiner that a particular packet was dropped in response to receiving a negative acknowledgement (NACK) message for the particular packet. For instance, in response to receiving a NACK message for a particular packet, communication controller 10 may attempt to re-transmit the packet to sink device 4.

The dropping of packets may be the result of poor channel conditions of wireless link 6. Wireless link 6 may suffer from poor channel conditions due to any number of circumstances. Some example circumstances include, but are not limited to, electromagnetic (EM) noise, low-signal strength, a large or dynamic distance between source device 2 and sink device 4, source device 2 being in an enclosure (e.g., a pocket, bag, or trunk), etc. Wireless link 6 may be considered to suffer from poor channel conditions in challenging radio frequency (RF) environments.

In any case, the dropping of packets may reduce the rate at which communication controller 10 drains (i.e., removes) blocks/packets from data buffer 12. Eventually, if the rate at which communication controller 10 drains blocks/packets from data buffer 12 is less than the rate at which blocks/packets are added to data buffer 12 (e.g., stored in), data buffer 12 may become full. When data buffer 12 is full, communication controller 10 may perform one or more actions to free-up space in data buffer 12. For instance, responsive to determining that data buffer 12 is full, communications controller 10 may remove stale blocks/packets from data buffer 12. The stale blocks/packets may be the oldest blocks/packets stored in data buffer 12.

The removal of stale blocks/packets may free-up space in data buffer 12 such that communication controller 10 may continue to store new audio data received from audio source 8 (e.g., as blocks or packets). Once channel conditions of wireless link 6 improve (e.g., the channel opens), communication controller 10 may resume transmission of audio packets to sink device 4. However, the audio data contained by the removed stale blocks/packets will be lost. As the removed stale blocks/packets contained audio data to be played back during a particular period of time, a user of sink device 4 may perceive gaps in the playback of the audio data.

In accordance with one or more techniques of this disclosure, communications controller 10 may automatically adjust a rate at which audio data is received from audio source 8 based on conditions of wireless link 6. For instance, communications controller 10 may determine a current condition of the wireless link (e.g., based on a lack of receipt of ACK messages). Based on the determined condition, communications controller 10 may apply "back pressure" to audio source 8 in order to reduce the rate at which audio source 8 outputs blocks of audio data. By reducing the rate at which audio source 8 outputs blocks of audio data, communications controller 10 may reduce the rate at which blocks of audio data are inserted into data buffer 12. By reducing the rate at which blocks are inserted into data buffer 12, communications controller 10 may avoid having to drop the oldest blocks from data buffer 12. In this way, the techniques of this disclosure enable communications controller 10 to avoid creating audio gaps.

Figure 2:
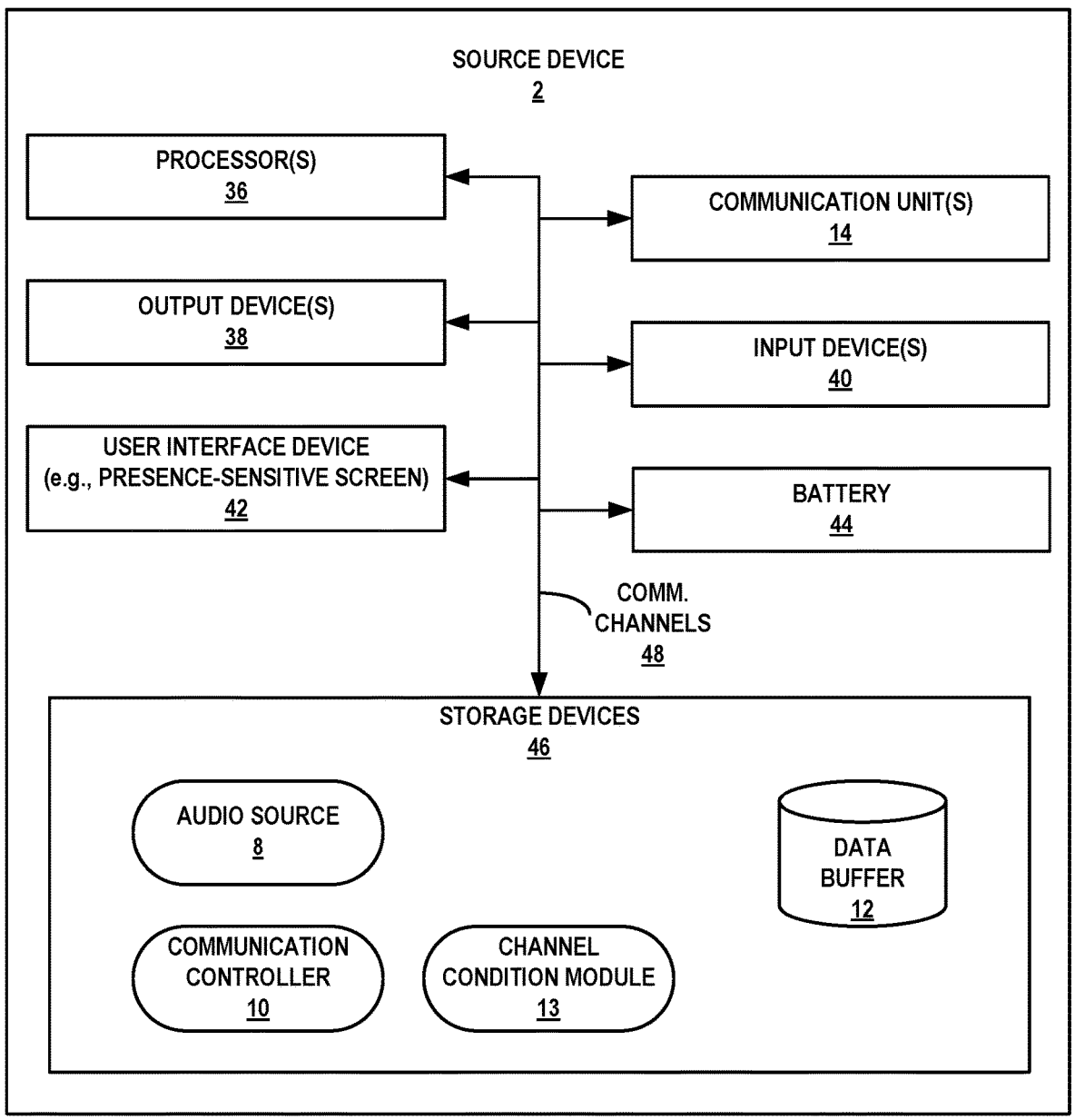
FIG. 2 is a block diagram illustrating an example source device configured to wirelessly stream audio data to a sink device, in accordance with one or more aspects of the present disclosure.

FIG. 2 is a block diagram illustrating an example source device configured to wirelessly stream audio data to a sink device, in accordance with one or more aspects of the present disclosure. Source device 2 of FIG. 2 is described below within the context of system 100 of FIG. 1. FIG. 2 illustrates only one particular example of source device 2 and many other examples of source device 2 may be used in other instances. In the example of FIG. 2, source device 2 may be a wearable computing device, a mobile computing device, or any other computing device capable of streaming audio data. Source device 2 of FIG. 2 may include a subset of the components included in example source device 2 or may include additional components not shown in FIG. 2.

As shown in the example of FIG. 2, source device 2 includes user interface device 42 ("UID 42"), one or more processors 36, one or more output devices 38, one or more input devices 40, one or more communication units 14, battery 44, and one or more storage devices 46. Storage devices 46 may also include audio source 8, communication controller 10, data buffer 12, and channel condition module 13.

Communication channels 48 may interconnect each of the components 14, 36, 38, 40, 42, 44, and 46 for inter-component communications (physically, communicatively, and/or operatively). In some examples, communication channels 48 may include a power bus, a system bus, a network connection, an inter-process communication data structure, or any other method for communicating data or transferring power.

One or more output devices 38 may generate output. Examples of output are tactile, audio, and video output. Output devices 38, in one example, includes a presence-sensitive display, sound card, video graphics adapter card, speaker, cathode ray tube (CRT) monitor, liquid crystal display (LCD), or any other type of device for generating output to a human or machine.

One or more input devices 40 may receive input. Examples of input are tactile, audio, and video input. Input devices 40, in some examples, includes a presence-sensitive display, touch-sensitive screen, mouse, keyboard, voice responsive system, video camera, microphone, sensor, or any other type of device for detecting input from a human or machine.

One or more communication units 14 are similar to communication units 14 of FIG. 1 and may include some of all of the same features of communication units 14 of FIG. 1. For instance, communication units 14 may communicate with external devices via one or more wired and/or wireless networks by transmitting and/or receiving network signals on the one or more networks.

UID 42 may include functionality of input devices 40 and/or output devices 38. In the example of FIG. 2, UID 42 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 38, e.g., at a display.

One or more storage devices 46 within source device 2 may store information for processing during operation of source device 2 (e.g., source device 2 may store data (e.g., audio blocks and/or packets at data buffer 12) that modules 8, 10, and 13 access during execution at source device 2). In some examples, storage device 46 is a temporary memory, meaning that a primary purpose of storage device 46 is not long-term storage. Storage devices 46 on source device 2 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 46, in some examples, include one or more computer-readable storage media. Storage devices 46 may be configured to store larger amounts of information than volatile memory. Storage devices 46 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 46 may store program instructions and/or information (e.g., data) associated with modules 8, 10, 13, and buffer 12.

One or more processors 36 may implement functionality and/or execute instructions within source device 2. For example, processors 36 on source device 2 may receive and execute instructions stored by storage devices 46 that execute the functionality of modules 8, 10, and 13. Processors 36 may execute instructions of modules 8, 10, and 13 to cause to perform various actions or functions of source device 2.

Audio source 8 and communication controller 10 may be additional examples of audio source 8 and communication controller 10 from FIG. 1, including similar and some or all the same functionality of audio source 8 and communication controller 10 from FIG. 1. For instance, audio source 8 may represent a software path configured to provide audio data to one or more other components of source device 2.

Data buffer 12 may be an example of data buffer 12 of FIG. 1 and may include functionality similar to data buffer 12 of FIG. 1. For instance, data buffer 12 may store audio blocks or encapsulated audio blocks for streaming to an external device, such as sink device 4 of FIG. 1.

As discussed above and in accordance with one or more techniques of this disclosure, communication controller 10 may automatically adjust a rate at which audio data is received from audio source 8 based on conditions of a wireless link between source device 2 and an external device (e.g., sink device 4). For instance, channel condition module 13 may determine a current condition of the wireless link based on a rate or quantity that audio data packets transmitted via the wireless link are dropped. As discussed above, a packet may be considered to be dropped when an acknowledgement message is not received within a threshold period of time since the packet was transmitted. Channel condition module 13 may determine the rate of packet drop as a quantity of packets dropped per unit time (e.g., #packets/second). Additionally or alternatively, channel condition module 13 may determine the current condition of the wireless link based on a throughput of the wireless link. For instance, channel condition module 13 may determine a quantity of packets per unit time that may be successfully transmitted via the wireless link.

Channel condition module 13 may output an indication of the current condition of the wireless link to communication controller 10, which may automatically adjust a rate at which audio data is received from audio source 8 based on the indication. In general, communication controller 10 may reduce the rate at which audio data is received from audio source 8 where channel condition module 13 indicates that the current condition of the wireless link may result in stale blocks/packets being removed from data buffer 12. As one example, communication controller 10 may reduce the rate at which audio data is received from audio source 8 in response to determining that the rate of packet drop is greater than a packet drop rate threshold. As another example, communication controller 10 may reduce the rate at which audio data is received from audio source 8 in response to determining that the throughput of the wireless link is lower than a current rate at which audio data is being received.

The automatic adjustment of the rate at which audio data is received may not always be a reduction. For instance, communication controller 10 may reduce the rate at a first time and increase the rate at which audio data is received at a second time after receiving an updated indication of channel conditions (e.g., indicating a lower drop rate and/or a higher throughput).

Communication controller 10 may adjust the rate at which audio data is received in a number of ways. As one example, communication controller 10 output an indication to audio source 8 indicating whether or not communication controller 10 is currently accepting/receiving additional audio data (e.g., to be wirelessly transmitted). For instance, to reduce the rate, communication controller 10 may output an indication to audio source 8 indicating that communication controller 10 is not currently accepting/receiving additional audio data (e.g., for instance, communication controller 10 may block). Similarly, to increase the rate, communication controller 10 may output an indication to audio source 8 indicating that communication controller 10 is currently accepting/receiving additional audio data. When communication controller 10 indicates that it is not currently accepting/receiving additional audio data, audio source 8 may "block" and hold data until communication controller 10 indicates that it is currently accepting/receiving additional audio data.

As another example, communication controller 10 may determine a desired rate and output a request to audio source 8 for audio source 8 to output additional audio data to communication controller 10 at the desired rate. Communication controller 10 may determine the desired rate based on one or more factors. Some example factors include, but are not limited to, a current rate at which audio data is being output by audio source 8, the current condition of the wireless link (e.g., #packets/sec dropped and/or #packets/sec throughput), a current drain rate (e.g., #packets/sec successfully transmitted), a size of data buffer 12, and an amount of data currently stored in data buffer 12. As one example, communication controller 10 may set the desired rate to the same rate as the current throughput of the wireless link. As another example, communication controller 10 may determine the desired rate as a current drain rate multiplied by some scaling factor beta depending on link quality. If the link quality is perfect, beta=1 and may scale down to ~0 for bad link quality.

As discussed above, audio source 8 may operate at a layer above (e.g., a higher layer of a stack) communication controller 10. As communication controller 10 is causing audio source 8 to change the rate at which audio source 8 outputs blocks of audio data, communication controller 10 may be considered to be applying "back pressure" to audio source 8. As discussed above, by automatically adjusting the rate which at which audio source 8 outputs blocks of audio data to communication controller 10, communication controller 10 may avoid having to delete or otherwise remove stale packets/blocks from data buffer 12. In this way, the techniques of this disclosure enable communications controller 10 to avoid creating gaps in audio playback.

In some examples, a size of data buffer 12 may be static. For instance, the size of data buffer 12 may be the same regardless of other conditions. In some examples, the size of data buffer 12 may be dynamic. For instance, at run time, communication controller 10 may dynamically adjust the size of data buffer 12. Communication controller 10 may request that storage devices 46 resize data buffer 12 (e.g., change a memory or storage allocation) to fixed length increments (e.g. 100 ms, 250 ms, 500 ms) or to any integer value between a min value and a max value.

Communication controller 10 may determine the origin of the audio data received from audio source 8 at an app level, such as a video streaming application, an audio streaming application, etc. Communication controller 10 may dynamically size data buffer 12 based on the determination of audio data origin. Raw audio may benefit from larger buffer sizes. However, video+audio data combined may require A/V sync and a large buffer may introduce latency problems.

As one specific example, a user may provide user input to source device 2 to start a video streaming application. The video from the video streaming application may be displayed at a display of source device 2 while the audio from the video streaming application may be streamed to sink device 4. Communication controller 10 may determine that the A/V sync should be prioritized and select a size for data buffer 12. As one example, communication controller 10 may select a size for data buffer 12 based on some heuristic+A/V sync consideration. As another example, communication controller 10 may select a size for data buffer 12 as a predetermined buffer size for A/V sync applications. As another example, the video streaming application may provide a requested buffer size and communication controller 10 may set the size of data buffer 12 to the requested buffer size.

Figure 3:
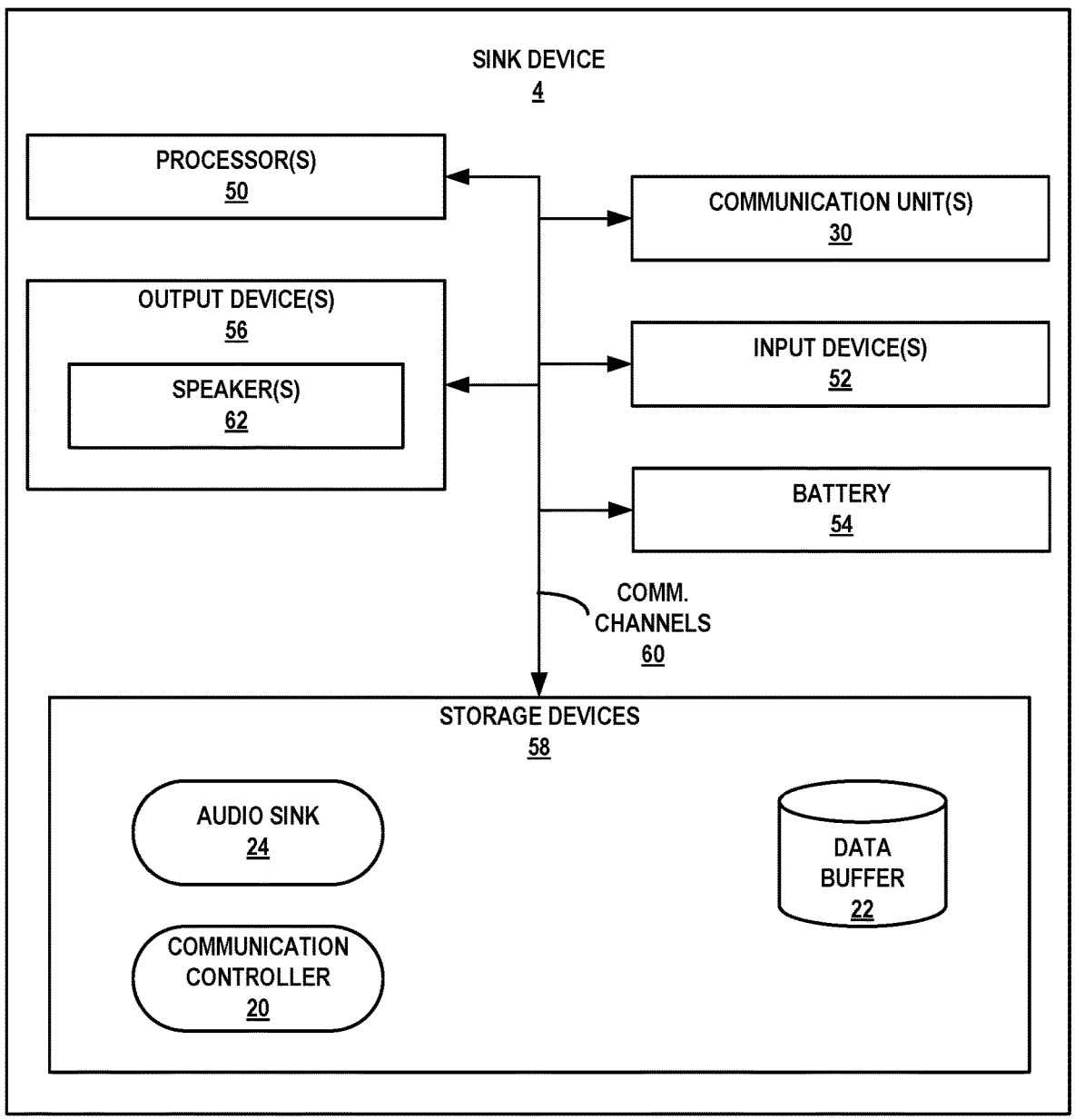
FIG. 3 is a block diagram illustrating an example sink device configured to wirelessly stream audio data from a source device, in accordance with one or more aspects of the present disclosure.

FIG. 3 is a block diagram illustrating an example sink device configured to wirelessly stream audio data from a source device, in accordance with one or more aspects of the present disclosure. Sink device 4 of FIG. 3 is described below within the context of system 100 of FIG. 1. FIG. 3 illustrates only one particular example of sink device 4 and many other examples of sink device 4 may be used in other instances. In the example of FIG. 2, sink device 4 may be a pair of wireless headphones. However, sink device 4 may also be any other type of mobile computing device such as a mobile phone, a vehicle, a wireless speaker, a camera device, a tablet computer, a personal digital assistant (PDA), a laptop computer, a gaming system, a media player, an e-book reader, a television platform, or a wearable computing device (e.g., a computerized watch, computerized eyewear, a computerized glove). Sink device 4 of FIG. 3 may include a subset of the components included in example sink device 4 or may include additional components not shown in FIG. 3.

As shown in the example of FIG. 3, sink device 4 includes one or more processors 50, one or more output devices 56, one or more input devices 52, one or more communication units 30, battery 54, and one or more storage devices 58. Storage devices 58 may also include audio sink 24, communication controller 20, and data buffer 12.

Communication channels 60 may interconnect each of the components 30, 50, 52, 54, 56, and 58 for inter-component communications (physically, communicatively, and/or operatively). In some examples, communication channels 60 may include a power bus, a system bus, a network connection, an inter-process communication data structure, or any other method for communicating data or transferring power.

One or more output devices 56 may generate output. Examples of output are tactile, audio, and video output. Output devices 38, in one example, includes a presence-sensitive display, sound card, video graphics adapter card, speaker, cathode ray tube (CRT) monitor, liquid crystal display (LCD), or any other type of device for generating output to a human or machine. As shown in FIG. 3, output device 38 include speaker(s) 62.

One or more input devices 52 may receive input. Examples of input are tactile, audio, and video input. Input devices 52, in some examples, includes a presence-sensitive display, touch-sensitive screen, mouse, buttons, switches, keyboard, voice responsive system, video camera, microphone, sensor, or any other type of device for detecting input from a human or machine.

One or more communication units 30 are similar to communication units 30 of FIG. 1 and may include some of all of the same features of communication units 30 of FIG. 1. For instance, communication units 30 may communicate with external devices via one or more wired and/or wireless networks by transmitting and/or receiving network signals on the one or more networks.

One or more storage devices 58 within sink device 4 may store information for processing during operation of sink device 4 (e.g., sink device 4 may store data (e.g., audio blocks and/or packets at data buffer 22) that modules 20 and 24 access during execution at sink device 4). In some examples, storage device 58 is a temporary memory, meaning that a primary purpose of storage device 58 is not long-term storage. Storage devices 58 on sink device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 58, in some examples, include one or more computer-readable storage media. Storage devices 58 may be configured to store larger amounts of information than volatile memory. Storage devices 58 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 58 may store program instructions and/or information (e.g., data) associated with modules 20 and 24, and buffer 22.

One or more processors 50 may implement functionality and/or execute instructions within sink device 4. For example, processors 50 on sink device 4 may receive and execute instructions stored by storage devices 58 that execute the functionality of modules 20 and 24. Processors 50 may execute instructions of modules 20 and 24 to cause to perform various actions or functions of sink device 4.

Audio sink 24 and communication controller 20 may be additional examples of audio sink 24 and communication controller 20 from FIG. 1, including similar and some or all the same functionality of audio sink 24 and communication controller 20 from FIG.1. For instance, audio sink 24 may represent a software path configured to receive audio data from communication controller 20 for playback by speakers 62.

Data buffer 22 may be an example of data buffer 22 of FIG. 1 and may include functionality similar to data buffer 22 of FIG. 1. For instance, data buffer 22 may store audio blocks or encapsulated audio blocks streamed from an external device, such as source device 2 of FIG. 1.

As discussed above, sink device 4 may receive packets from an external device via a wireless link. For instance, sink device 4 may receive packets encapsulating blocks of audio data from source device 2 via wireless link 6. In response to receiving a packet, communication controller 20 may cause communication units 30 to output an acknowledgement of receipt to the external device. As discussed above, the acknowledgement may be in the form of an ACK message.

Figure 4:
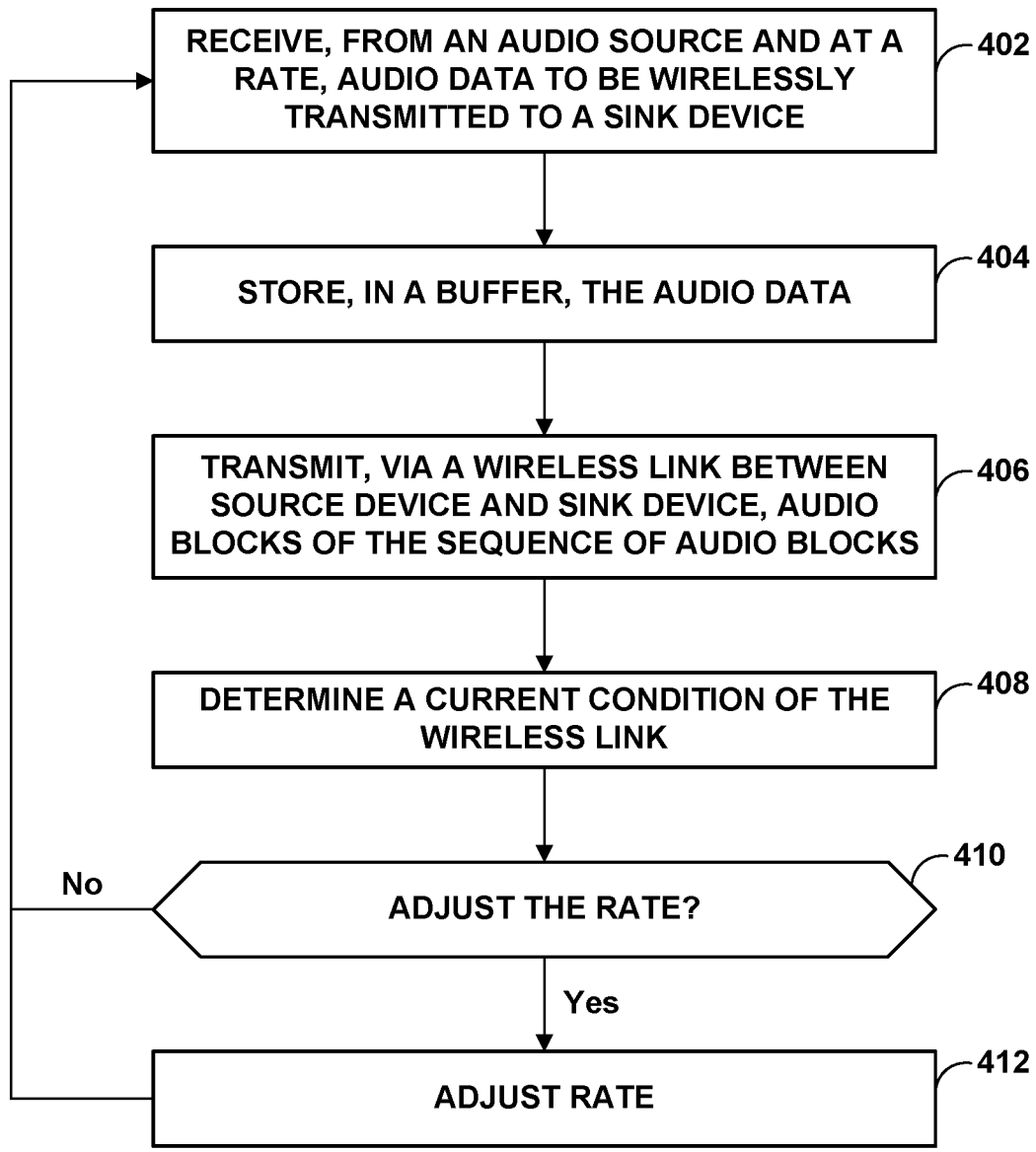
FIG. 4 is a flowchart illustrating example operations of an example source device configured to wirelessly stream audio data to a sink device, in accordance with one or more aspects of the present disclosure.

FIG. 4 is a flowchart illustrating example operations of an example source device configured to wirelessly stream audio data to a sink device, in accordance with one or more aspects of the present disclosure. The operations of source device 2 are described within the context of system 100 of FIG. 1, and source device 2 of FIG. 1 and FIG. 2.

Communication controller 10 of source device 2 may receive, from audio source 8 of source device 2 and at a rate, audio data to be wirelessly transmitted to a sink device (402). For instance, communication controller 10 may receive a sequence of audio blocks that each contains audio data to be played back at one or more respective periods of time. In other words, each audio block may include audio data for at least one respective output time.

Communication controller 10 may store, in data buffer 12, the received audio data (404). For instance, communication controller 10 may store the received audio data in data buffer 12 as a sequence of audio blocks. In some examples, communication controller 10 may encapsulate the audio blocks into packets prior to storing in data buffer 12.

Source device 2 may transmit, to the sink device and using a wireless link, audio blocks of the sequence of audio blocks (406). For instance, communication controller 10 may cause one or more of communication units 14 to transmit the audio blocks to sink device 4 via wireless link 6. As discussed above, in some examples, communication controller 10 may encapsulate the audio blocks into audio data packets prior to causing one or more of communication units 14 to transmit the audio data packets.

Source device 2 may determine a current condition of the wireless link (408). For instance, channel condition module 13 of source device 2 of FIG. 2 may determine the current condition of the wireless link based on one or both of a quantity of packets being dropped and/or a current throughput of the wireless link.

Communication controller 10 may determine whether or not to adjust the rate at which audio data is received from the audio source (410). For instance, communication controller 10 may determine to reduce, increase, or make no change to the rate based on the current condition of the wireless link. As discussed above, in general, communication controller 10 may determine to reduce the rate at which audio data is received from audio source 8 where the current condition of the wireless link may result in stale blocks/packets being removed from data buffer 12. Conversely, communication controller 10 may determine to increase the rate at which audio data is received from audio source 8 where the current condition of the wireless link may result in an under flow of data buffer 12. Additionally, communication controller 10 may determine to make no change to the rate where communication controller 10 determines to neither reduce nor increase the rate.

In response to determining not to adjust the rate ("No" branch of 410), communication controller 10 may continue to receive audio data at the unchanged rate (402). In response to determining to adjust the rate ("Yes" branch of 410), communication controller 10 may adjust the rate (412) and receive audio data at the changed rate (402). As discussed above, communication controller 10 may adjust the rate in a number of ways including, but not limited to, requesting that the audio source output audio data at a rate specified by communication controller 10, and informing the audio source of whether communication controller 10 is or is not current accepting additional audio data to be wirelessly transmitted to the sink device. As one example, communication controller 10 may request that audio source 8 adjust the rate at which audio source 8 is providing samples to communication controller 10. In response to the request, audio source 8 may either directly adjust the rate, or may perform one or more other actions (e.g., at any level of the stack) to adjust the rate. An example of such an action is causing an app to stop pulling new audio samples from its source (e.g., a server).

The following numbered examples may illustrate one or more aspects of the disclosure:

Example 1. A method comprising: receiving, by a communication controller of a source device and from an audio source of the source device, audio data to be wirelessly transmitted to a sink device, wherein the audio data is received from the audio source at a rate; storing, by the communication controller and in a buffer, the audio data as a sequence of audio blocks, wherein each audio block includes audio data for a respective output time; transmitting, by the source device and to the sink device, audio blocks of the sequence of audio blocks using a wireless link between the source device and the sink device; determining a current condition of the wireless link; and automatically adjusting, by the communication controller and based on the current condition of the wireless link, the rate at which audio data is received from the audio source.

Example 2. The method of example 1, wherein automatically adjusting the rate at which the audio data is received comprises outputting, by the communication controller and to the audio source, a request to adjust a rate at which the audio source outputs the audio data to be wirelessly transmitted to the sink device.

Example 3. The method of example 1, wherein automatically adjusting the rate at which the audio data is received comprises outputting, by the communication controller and to the audio source an indication of whether the communication controller is currently receiving additional audio data to be wirelessly transmitted to the sink device.

Example 4. The method of any of examples 1-3, wherein transmitting the audio blocks comprises: encapsulating audio blocks of the sequence of audio blocks in audio data packets of a sequence of audio data packets; and transmitting, using the wireless link, the audio data packets.

Example 5. The method of example 4, wherein determining the current condition of the wireless link comprises: determining a rate at which the audio data packets are being dropped during transmission using the wireless link; and determining the current condition of the wireless link based on the rate at which the audio packets are being dropped.

Example 6. The method of example 5, further comprising: receiving, by the source device and from the sink device, one or more acknowledgement messages using the wireless link, each respective acknowledgement message indicating receipt by the sink device of a corresponding audio data packet of the sequence of audio data packets; and determining, based on whether or not an acknowledgement message of the one or more acknowledgement messages that corresponds to a particular audio data packet of the sequence of audio data packets, whether the particular audio data packet has been dropped or successfully received by the sink device, wherein determining the rate at which the audio packets are being dropped comprises determining the rate at which the audio packets are being dropped based on whether the particular audio data packet has been dropped or successfully received by the sink device.

Example 7. The method of any of examples 1-6, further comprising: responsive to determining that the particular audio packet has been successfully received by the sink device, removing, by the communications controller and from the buffer, an audio block corresponding to the particular audio data packet.

Example 8. The method of any of examples 1-7, further comprising: responsive to determining that the buffer is full, removing, by the communication controller and from the buffer, an audio data block corresponding to an oldest audio data packet of the sequence of audio data blocks.

Example 9. The method of any of examples 1-8, wherein the wireless link comprises a BLUETOOTH link.

Example 10. A source device comprising: a communication unit; an audio source; a communication controller; and at least one non-transitory computer-readable storage medium storing instructions that are executable by the communication controller to: receive, from the audio source and at a rate, audio data to be wirelessly transmitted to a sink device; store, in a buffer, the audio data as a sequence of audio blocks, wherein each audio block includes audio data for a respective output time; cause the communication unit to transmit, to the sink device and via a wireless link between the source device and the sink device, audio blocks of the sequence of audio blocks; determine a current condition of the wireless link; and automatically adjust, based on the current condition of the wireless link, the rate at which audio data is received from the audio source.

Example 11. The source device of example 10, wherein the instructions that cause the communication controller to automatically adjust the rate at which the audio data is received comprise instructions that cause the communication controller to output, to the audio source, a request to adjust a rate at which the audio source outputs the audio data to be wirelessly transmitted to the sink device.

Example 12. The source device of example 10, wherein the instructions that cause the communication controller to automatically adjust the rate at which the audio data is received comprise instructions that cause the communication controller to output, to the audio source an indication of whether the communication controller is currently receiving additional audio data to be wirelessly transmitted to the sink device.

Example 13. The source device of any of examples 10-12, wherein the instructions that cause the communication controller to transmit the audio blocks comprise instructions that cause the communication controller to encapsulate audio blocks of the sequence of audio blocks in audio data packets of a sequence of audio data packets; and cause the communication unit to transmit, using the wireless link, the audio data packets.

Example 14. The source device of example 13, wherein the instructions that cause the communication controller to determine the current condition of the wireless link comprise instructions that cause the communication controller to: determine a rate at which the audio data packets are being dropped during transmission using the wireless link; and determine the current condition of the wireless link based on the rate at which the audio packets are being dropped.

Example 15. The source device of example 14, further comprising instructions that cause the communication controller to: receive, from the sink device, one or more acknowledgement messages using the wireless link, each respective acknowledgement message indicating receipt by the sink device of a corresponding audio data packet of the sequence of audio data packets; and determine, based on whether or not an acknowledgement message of the one or more acknowledgement messages that corresponds to a particular audio data packet of the sequence of audio data packets, whether the particular audio data packet has been dropped or successfully received by the sink device.

Example 16. The source device of any of examples 10-15, further comprising instructions that cause the communication controller to: remove, responsive to determining that the particular audio packet has been successfully received by the sink device, from the buffer, an audio block corresponding to the particular audio data packet.

Example 17. The source device of any of examples 10-16, further comprising instructions that cause the communication controller to: remove, responsive to determining that the buffer is full, from the buffer, an audio data block corresponding to an oldest audio data packet of the sequence of audio data blocks.

Example 18. The source device of any of examples 10-17, wherein the wireless link comprises a BLUETOOTH link.

Example 19. A non-transitory computer-readable storage medium storing instructions that, when executed, cause a communication controller of a source device to receive, from an audio source of the source device, audio data to be wirelessly transmitted to a sink device, wherein the audio data is received from the audio source at a rate; store, in a buffer, the audio data as a sequence of audio blocks, wherein each audio block includes audio data for a respective output time; cause a communication unit of the source device to transmit, to the sink device, audio blocks of the sequence of audio blocks using a wireless link between the source device and the sink device; determine a current condition of the wireless link; and automatically adjust, based on the current condition of the wireless link, the rate at which audio data is received from the audio source.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
  receiving, by a communication controller of a source device and from an audio source of the source device, audio data to be wirelessly transmitted to a sink device, wherein the audio data is received from the audio source at a rate;
  storing, by the communication controller and in a buffer, the audio data as a sequence of audio blocks, wherein each audio block includes audio data for a respective output time;
  transmitting, by the source device and to the sink device, audio blocks of the sequence of audio blocks using a wireless link between the source device and the sink device;
  responsive to determining that a particular audio block has been successfully received by the sink device, removing, by the communications controller and from the buffer, an audio block corresponding to the particular audio block;
  determining a current condition of the wireless link; and
  automatically adjusting, by the communication controller and based on the current condition of the wireless link, the rate at which audio data is received from the audio source,
  wherein automatically adjusting the rate at which audio data is received comprises outputting, by the communication controller and to the audio source, a request to reduce the rate at which the audio source inserts audio blocks into the buffer to defer dropping an oldest audio block from the buffer when the data buffer becomes full.

2. The method of claim 1, wherein automatically adjusting the rate at which the audio data is received comprises outputting, by the communication controller and to the audio source, an indication of whether the communication controller is currently receiving additional audio data to be wirelessly transmitted to the sink device.

3. The method of claim 1, wherein transmitting the audio blocks comprises:
  encapsulating audio blocks of the sequence of audio blocks in audio data packets of a sequence of audio data packets; and
  transmitting, using the wireless link, the audio data packets.

4. The method of claim 3, wherein determining the current condition of the wireless link comprises:
  determining a rate at which the audio data packets are being dropped during transmission using the wireless link; and
  determining the current condition of the wireless link based on the rate at which the audio packets are being dropped.

5. The method of claim 4, further comprising:
  receiving, by the source device and from the sink device, one or more acknowledgement messages using the wireless link, each respective acknowledgement message indicating receipt by the sink device of a corresponding audio data packet of the sequence of audio data packets; and
  determining, based on whether or not an acknowledgement message of the one or more acknowledgement messages that corresponds to a particular audio data packet of the sequence of audio data packets, whether the particular audio data packet has been dropped or successfully received by the sink device, wherein determining the rate at which the audio packets are being dropped comprises determining the rate at which the audio packets are being dropped based on whether the particular audio data packet has been dropped or successfully received by the sink device.

6. The method of claim 1, further comprising:
  responsive to determining that the buffer is full, removing, by the communication controller and from the buffer, an audio data block corresponding to an oldest audio data packet of the sequence of audio data blocks.

7. The method of claim 1, wherein the wireless link comprises a BLUETOOTH link.

8. A source device comprising:
  a communication unit;
  an audio source;
  a communication controller; and
  at least one non-transitory computer-readable storage medium storing instructions that are executable by the communication controller to:
    receive, from the audio source and at a rate, audio data to be wirelessly transmitted to a sink device;
    store, in a buffer, the audio data as a sequence of audio blocks, wherein each audio block includes audio data for a respective output time;
    cause the communication unit to transmit, to the sink device and via a wireless link between the source device and the sink device, audio blocks of the sequence of audio blocks;
    remove, by the communications controller and from the buffer, an audio block corresponding to a particular audio block responsive to the particular audio block being successfully received by the sink device;

determine a current condition of the wireless link; and automatically adjust, based on the current condition of the wireless link, the rate at which audio data is received from the audio source, by the communication controller outputting to the audio source a request to reduce the rate at which the audio source inserts audio blocks into the buffer to defer dropping an oldest audio block from the buffer when the data buffer becomes full.

9. The source device of claim 8, wherein the instructions that cause the communication controller to automatically adjust the rate at which the audio data is received comprise instructions that cause the communication controller to output, to the audio source, a request to adjust a rate at which the audio source outputs the audio data to be wirelessly transmitted to the sink device.

10. The source device of claim 8, wherein the instructions that cause the communication controller to automatically adjust the rate at which the audio data is received comprise instructions that cause the communication controller to output, to the audio source, an indication of whether the communication controller is currently receiving additional audio data to be wirelessly transmitted to the sink device.

11. The source device of claim 8, further comprising instructions that cause the communication controller to transmit the audio blocks, wherein the instructions that cause the communication controller to transmit the audio blocks comprise instructions that cause the communication controller to:

encapsulate audio blocks of the sequence of audio blocks in audio data packets of a sequence of audio data packets; and transmit, using the wireless link, the audio data packets.

12. The source device of claim 11, wherein the instructions that cause the communication controller to determine the current condition of the wireless link comprise instructions that cause the communication controller to:

determine a rate at which the audio data packets are being dropped during transmission using the wireless link; and determine the current condition of the wireless link based on the rate at which the audio packets are being dropped.

13. The source device of claim 12, further comprising instructions that cause the communication controller to:

receive, from the sink device, one or more acknowledgement messages using the wireless link, each respective acknowledgement message indicating receipt by the sink device of a corresponding audio data packet of the sequence of audio data packets; and determine, based on whether or not an acknowledgement message of the one or more acknowledgement messages that corresponds to a particular audio data packet of the sequence of audio data packets, whether the particular audio data packet has been dropped or successfully received by the sink device, wherein the instructions that cause the communication controller to determine the rate at which the audio packets are being dropped comprise instructions that cause the communication controller to determine the rate at which the audio packets are being dropped based on whether the particular audio data packet has been dropped or successfully received by the sink device.

14. The source device of claim 8, further comprising instructions that cause the communication controller to:

remove, responsive to determining that the buffer is full, from the buffer, an audio data block corresponding to an oldest audio data packet of the sequence of audio data blocks.

15. A non-transitory computer-readable storage medium storing instructions that, when executed, cause a communication controller of a source device to:

receive, from an audio source of the source device, audio data to be wirelessly transmitted to a sink device, wherein the audio data is received from the audio source at a rate;

store, in a buffer, the audio data as a sequence of audio blocks, wherein each audio block includes audio data for a respective output time;

transmit, to the sink device, audio blocks of the sequence of audio blocks using a wireless link between the source device and the sink device;

remove, from the buffer, an audio block corresponding to a particular audio block responsive to the particular audio block being successfully received by the sink device;

determine a current condition of the wireless link; and automatically adjust, based on the current condition of the wireless link, the rate at which audio data is received from the audio source by at least outputting, to the audio source, a request to reduce the rate at which the audio source inserts audio blocks into the buffer to defer dropping an oldest audio block from the buffer when the data buffer becomes full.

* * * * *